United States Patent
Masel et al.

(10) Patent No.: US 10,396,329 B2
(45) Date of Patent: Aug. 27, 2019

(54) BATTERY SEPARATOR MEMBRANE AND BATTERY EMPLOYING SAME

(71) Applicant: Dioxide Materials, Inc., Boca Raton, FL (US)

(72) Inventors: Richard I. Masel, Boca Raton, FL (US); Zengcai Liu, Boca Raton, FL (US)

(73) Assignee: Dioxide Materials, Inc., Boca Raton, FL (US)

( * ) Notice: Subject to any disclaimer, the term of this patent is extended or adjusted under 35 U.S.C. 154(b) by 0 days.

(21) Appl. No.: 16/164,289

(22) Filed: Oct. 18, 2018

(65) Prior Publication Data

US 2019/0109310 A1 Apr. 11, 2019

Related U.S. Application Data

(63) Continuation-in-part of application No. 15/677,797, filed on Aug. 15, 2017, now Pat. No. 10,147,974.

(Continued)

(51) Int. Cl.
*H01M 2/16* (2006.01)
*B01J 41/14* (2006.01)
*H01M 10/26* (2006.01)

(52) U.S. Cl.
CPC ........... *H01M 2/1653* (2013.01); *B01J 41/14* (2013.01); *H01M 2/1646* (2013.01);
(Continued)

(58) Field of Classification Search
None
See application file for complete search history.

(56) References Cited

U.S. PATENT DOCUMENTS

| 3,401,099 A | 9/1968 | McEvoy |
| 3,779,883 A | 12/1973 | Heit |

(Continued)

FOREIGN PATENT DOCUMENTS

| EP | 0151510 A1 | 8/1985 |
| KR | 101360269 B1 | 11/2012 |

(Continued)

OTHER PUBLICATIONS

Dewulf et al., "The electrochemical reduction of CO2 to CH4 and C2H4 at cu/nation electrodes (solid polymer electrolyte structures)", Catalysis Letters 1 (1988), pp. 73-80.

(Continued)

*Primary Examiner* — Alix E Eggerding
(74) *Attorney, Agent, or Firm* — Corridor Law Group, P.C.

(57) ABSTRACT

A battery comprises a separator membrane comprising an ion-conducting polymeric composition comprising a copolymer of $R_a$-$R_s$ and $R_b$. $R_a$ and $R_b$ are each selected from the group consisting of linear alkyls, branched alkyls, cyclic alkyls, heteroalkyls, aryls, heteroaryls, alkylaryls, and heteroalkylaryls. $R_s$ is a positively charged amine group or a positively charged phosphene group. The copolymer comprises at least 3% of each $R_a$ and $R_b$ by weight. $R_a$ and $R_b$ are different chemical constituents, and $R_a$-$R_s$ is not vinylpyridine.

19 Claims, 1 Drawing Sheet

Related U.S. Application Data which is a continuation-in-part of application No. PCT/US2018/030154, filed on Apr. 30, 2018.

(60) Provisional application No. 62/492,946, filed on May 1, 2017.

(52) U.S. Cl.
CPC ......... *H01M 2/1686* (2013.01); *H01M 10/26* (2013.01); *H01M 2300/0082* (2013.01)

(56) References Cited

U.S. PATENT DOCUMENTS

| | | | |
|---|---|---|---|
| 3,896,015 | A | 7/1975 | McRae |
| 4,113,922 | A | 9/1978 | D'Agostino et al. |
| 4,430,445 | A | 2/1984 | Miyake et al. |
| 4,456,521 | A | 6/1984 | Solomon et al. |
| 4,523,981 | A | 6/1985 | Ang et al. |
| 4,673,473 | A | 6/1987 | Ang et al. |
| 4,921,585 | A | 5/1990 | Molter |
| 5,883,762 | A | 3/1999 | Calhoun et al. |
| 5,997,715 | A | 12/1999 | Roberts et al. |
| 7,704,369 | B2 | 4/2010 | Olah et al. |
| 7,931,824 | B2* | 4/2011 | Gin .............. C07D 233/64 252/299.01 |
| 8,138,380 | B2 | 3/2012 | Olah et al. |
| 8,313,634 | B2 | 11/2012 | Bocarsly et al. |
| 8,357,270 | B2 | 1/2013 | Gilliam et al. |
| 8,414,758 | B2 | 4/2013 | Deguchi et al. |
| 8,449,652 | B2 | 5/2013 | Radosz et al. |
| 8,500,987 | B2 | 8/2013 | Teamey et al. |
| 8,524,066 | B2 | 9/2013 | Sivasankar et al. |
| 8,552,130 | B2 | 10/2013 | Lewandowski et al. |
| 8,562,811 | B2 | 10/2013 | Sivasankar et al. |
| 8,568,581 | B2 | 10/2013 | Sivasankar et al. |
| 8,592,633 | B2 | 11/2013 | Cole et al. |
| 8,658,016 | B2 | 2/2014 | Lakkaraju et al. |
| 8,663,447 | B2 | 3/2014 | Bocarsly et al. |
| 8,696,883 | B2 | 4/2014 | Yotsuhashi et al. |
| 8,721,866 | B2 | 5/2014 | Sivasankar et al. |
| 9,255,335 | B2 | 2/2016 | Kanan et al. |
| 9,370,773 | B2 | 6/2016 | Masel et al. |
| 9,481,939 | B2 | 11/2016 | Masel et al. |
| 9,580,824 | B2 | 2/2017 | Masel et al. |
| 9,849,450 | B2 | 12/2017 | Masel et al. |
| 9,943,841 | B2 | 4/2018 | Masel et al. |
| 9,945,040 | B2 | 4/2018 | Masel et al. |
| 9,982,353 | B2 | 5/2018 | Masel et al. |
| 10,047,446 | B2 | 8/2018 | Kaczur et al. |
| 2002/0136959 | A1 | 9/2002 | Park et al. |
| 2007/0259236 | A1 | 11/2007 | Lang et al. |
| 2009/0266230 | A1 | 10/2009 | Adosz et al. |
| 2009/0297911 | A1 | 12/2009 | Moore et al. |
| 2011/0114502 | A1 | 5/2011 | Cole et al. |
| 2011/0237830 | A1 | 9/2011 | Masel |
| 2012/0077092 | A1 | 3/2012 | Lee et al. |
| 2012/0136959 | A1 | 5/2012 | Kadam et al. |
| 2012/0171583 | A1 | 7/2012 | Bocarsly et al. |
| 2012/0186446 | A1 | 7/2012 | Bara et al. |
| 2012/0247969 | A1 | 10/2012 | Bocarsly et al. |
| 2013/0105304 | A1 | 5/2013 | Kaczur et al. |
| 2013/0146448 | A1 | 6/2013 | Wang et al. |
| 2013/0175181 | A1 | 7/2013 | Kaczur et al. |
| 2013/0180865 | A1 | 7/2013 | Cole et al. |
| 2013/0199937 | A1 | 8/2013 | Cole et al. |
| 2015/0093628 | A1 | 4/2015 | Halalay et al. |
| 2015/0171453 | A1 | 6/2015 | Chikashige et al. |
| 2015/0345034 | A1 | 12/2015 | Sundara et al. |
| 2016/0107154 | A1 | 4/2016 | Masel et al. |
| 2016/0108530 | A1 | 4/2016 | Masel et al. |
| 2016/0251766 | A1 | 9/2016 | Masel et al. |
| 2016/0254514 | A1 | 9/2016 | Roumi |
| 2017/0128930 | A1 | 5/2017 | Masel et al. |
| 2017/0189898 | A1 | 7/2017 | Masel et al. |
| 2017/0194633 | A1* | 7/2017 | Schumann .............. H01M 4/136 |
| 2017/0233881 | A1 | 8/2017 | Masel et al. |
| 2017/0263907 | A1* | 9/2017 | Ameyama .............. H01G 11/52 |
| 2018/0030187 | A1 | 2/2018 | Wang et al. |
| 2018/0127668 | A1 | 5/2018 | Masel |
| 2018/0316063 | A1 | 11/2018 | Masel et al. |

FOREIGN PATENT DOCUMENTS

| | | |
|---|---|---|
| WO | 2008110830 A1 | 9/2008 |
| WO | 2016039999 A1 | 3/2015 |
| WO | WO 2016039999 A1 | 3/2015 |

OTHER PUBLICATIONS

Kaneco et al., "Electrochemical conversion of carbon dioxide to methane in aqueous NaHCO3 solution at less than 273 K" Electrochimica Acta 48 (2002), pp. 51-55.

Lee et al., "Humidity-sensitive properties of new polyelectrolytes based on the copolymers containing phosphonium salt and phosphine function", J. Applied Polymer Science 89 (2003), pp. 1062-1070.

Tang et al., "Poly(ionic liquid)s as New Materials for CO2 Absorption", Journal of Polymer Science Part A: Polymer Chemistry 43 (2005), pp. 5477-5489.

Siroma et al., "Compact dynamic hydrogen electrode unit as a reference electrode for PEMFCs", J. of Power Sources 156 (2006), pp. 284-287.

Chen et al., "A Concept of Supported Amino Acid Ionic Liquids and Their Application in Metal Scavenging and Heterogeneous Catalysis", J. Am. Chem. Soc. 129 (2007), pp. 13879-13886.

Delacourt et al., "Design of an Electrochemical Cell Making Syngas (CO + H2) from CO2 and H2O Reduction at Room Temperature", J. of the Electrochemical Society 155 (2008), pp. B42-B49.

Wang et al., "Water-Retention Effect of Composite Membranes with Different Types of Nanometer Silicon Dioxide" Electrochemical and Solid State Letters 11 (2008), p. B201.

Luo et al., "Quaternized poly(methyl methacrylate-co-butyl acrylate-co-vinylbenzyl chloride) membrane for alkaline fuel cells", J. Power Sources. 195 (2010), pp. 3765-3771.

Tsutsumi et al., "A Test Method of a PEFC Single Cell with Reference Electrodes", Electrical Engineering in Japan, vol. 172, No. 1 (2010), pp. 1020-1026.

Li et al., "Novel anion exchange membranes based on polymerizable imidazolium salt for alkaline fuel cell applications", J. Mater. Chem. 21 (2011), pp. 11340-11346.

Narayanan et al., "Electrochemical Conversion of Carbon Dioxide to Formate in Alkaline Polymer Electrolyte Membrane Cells", J. of the Electrochemical Society 158 (2011), pp. A167-A173.

Rosen et al., "Ionic Liquid—Mediated Selective Conversion of CO2 to CO at Low Overpotentials", Science 334 (2011) pp. 643-644.

Weber et al., "Thermal and Ion Transport Properties of Hydrophilic and Hydrophobic Polymerized Styrenic Imidazolium Ionic Liquids", J. of Polymer Sci.: Part B: Polymer Phy. 49 (2011) pp. 1287-1296.

Sarode et al., "Designing Alkaline Exchange Membranes from Scratch", The Electrochemical Society, 220th ECS Meeting (2011).

Zhang et al., "Imidazolium functionalized polysulfone anion exchange membrane for fuel cell application", J. Mater. Chem. 21 (2011), pp. 12744-12752.

Aeshala et al., "Effect of solid polymer electrolyte on electrochemical reduction of CO2", Separation and Purification Technology 94 (2012), pp. 131-137.

Deavin et al., "Anion-Exchange Membranes for Alkaline Polymer Electrolyte Fuel Cells: Comparison of Pendent Benzyltrimethylammonium- and Benzylmethylimidazolium-Head-Groups", Energy Environ. Sci. 5 (2012), pp. 8584-8597.

Oh, "Synthesis and Applications of Imidazolium-Based Ionic Liquids and Their Polymer Derivatives", Dissertation at the Missouri University of Science and Technology (2012).

Qiu et al., "Alkaline Imidazolium- and Quaternary Ammonium-Functionalized Anion Exchange Membranes for Alkaline Fuel Cell Applications", J. Mater. Chem. 22 (2012), pp. 1040-1045.

(56) References Cited

OTHER PUBLICATIONS

Rosen et al., "In Situ Spectroscopic Examination of a Low Overpotential Pathway for Carbon Dioxide Conversion to Carbon Monoxide", J. of Physical Chemistry 116 (2012), pp. 15307-15312.
Aeshala et al., "Effect of cationic and anionic solid polymer electrolyte on direct electrochemical reduction of gaseous CO2 to fuel", Journal of CO2 Utilization 3-4 (2013), pp. 49-55.
Carmo et al., "A comprehensive review on PEM water electrolysis", International J. of Hydrogen Energy 38 (2013), pp. 4901-4934.
Chen et al., "Composite Blend Polymer Membrane with Increased Proton Selectivity and Lifetime for Vanadium Redox Flow Batteries", J. of Power Sources 231 (2013), pp. 301-306.
Genovese et al., "A gas-phase electrochemical reactor for carbon dioxide reduction back to liquid fuels", AIDIC Conference Series 11 (2013), pp. 151-160.
Hickner et al., "Anion Exchange Membranes: Current Status and Moving Forward", J. of Polymer Sci. 51 (2013), pp. 1727-1735.
Lin et al., "Alkaline Stable C2-Substituted Imidazolium-Based Anion-Exchange Membranes", Chem. Mater. 25 (2013), pp. 1858-1867.
Prakash et al., "Electrochemical reduction of CO2 over Sn-Nafion coated electrode for a fuel-cell-like device", J. of Power Sources 223 (2013), pp. 68-73.
Rosen et al., "Low temperature electrocatalytic reduction of carbon dioxide utilizing room temperature ionic liquids", Dissertation at the University of Illinois (2013).
Rosen et al., "Water Enhancement of CO2 Conversion on Silver in 1-Ethyl-3-Methylimidazolium Tetrafluoroborate", J. of the Electrochemical Society 160 (2013), pp. H138-H141.
Shironita et al., "Feasibility investigation of methanol generation by CO2 reduction using Pt/C-based membrane electrode assembly for a reversible fuel cell", J. of Power Sources 228 (2013), pp. 68-74.
Shironita et al., "Methanol generation by CO2 reduction at a PteRu/C electrocatalyst using a membrane electrode assembly", J. of Power Sources 240 (2013), pp. 404-410.
Thorson et al., "Effect of Cations on the Electrochemical Conversion of CO2 to CO", J. of the Electrochemical Society 160 (2013), pp. F69-F74.
Wu et al., "Electrochemical Reduction of Carbon Dioxide", J. of the Electrochemical Society 160 (2013), pp. F953-F957.
Aeshala et al., "Electrochemical conversion of CO2 to fuels: tuning of the reaction zone using suitable functional groups in a solid polymer electrolyte", Phys. Chem. Chem. Phys. 16 (2014), pp. 17588-17594.
Carlisle et al., "Vinyl-Functionalized Poly(imidazolium)s: A Curable Polymer Platform for Cross-Linked Ionic Liquid Gel Synthesis", Chem. Mater. 26 (2014), pp. 1294-1296.
Ma et al., "Efficient Electrochemical Flow System with Improved Anode for the Conversion of CO2 to CO", J. of the Electrochemical Society 161 (2014), pp. F1124-F1131.
Parrondo et al., "Degradation of Anion Exchange Membranes Used for Hydrogen Production by Ultrapure Water Electrolysis", Royal Soc. of Chem. Adv. 4 (2014), pp. 9875-9879.
Said et al., "Functionalized Polysulfones as an Alternative Material to Improve Proton Conductivity at Low Relative Humidity Fuel Cell Applications", Chemistry and Materials Research 6 (2014), pp. 19-29.
Shi et al., "A novel electrolysis cell for CO2 reduction to CO in ionic liquid/organic solvent electrolyte", Journal of Power Sources 259 (2014) pp. 50-53.
Varcoe et al., "Anion-exchange membranes in electrochemical energy systems", Energy Environ. Sci. 7 (2014), pp. 3135-3191.
Yan et al., "Imidazolium-functionalized poly(ether ether ketone) as membrane and electrode ionomer for low-temperature alkaline membrane direct methanol fuel cell", Journal of Power Sources 250 (2014) pp. 90-97.
International Search Report and Written Opinion dated Jul. 6, 2015 in connection with International Application PCT/US2015/014328.
International Search Report and Written Opinion dated Jul. 20, 2015 in connection with International Application PCT/US2015/026507.
Kim et al., "Influence of dilute feed and pH on electrochemical reduction of CO2 to CO on Ag in a continuous flow electrolyzer", Electrochimica Acta 166 (2015), pp. 271-276.
Schauer et al., "Polysulfone-based anion exchange polymers for catalyst binders in alkaline electrolyzers", Journal of Applied Polymer Science (2015), pp. 1-7.
Korean Office Action dated Sep. 13, 2016 in connection with Korean Patent Application No. 10-2016-7022952.
Partial International Search Report dated Nov. 24, 2016 in connection with International Application PCT/US2016/045210.
International Search Report and Written Opinion dated Jan. 20, 2017 in connection with International Application PCT/US2016/045210.
International Preliminary Report on Patentability dated May 4, 2017 in connection with International Application PCT/US2015/026507.
International Preliminary Report on Patentability dated May 4, 2017 in connection with International Application No. PCT/US2015/014328.
Korean Office Action dated May 29, 2017 in connection with Korean Patent Application No. 10-2016-7022952.
Partial International Search Report dated on Jun. 22, 2017 in connection with International Application PCT/US2017/025624.
Australian Office Action dated Jun. 29, 2017 in connection with Australian Patent Application No. 2015337093.
International Search Report and Written Opinion dated Jul. 12, 2017 in connection with International Application No. PCT/US2017/025628.
International Search Report and Written Opinion dated Aug. 16, 2017 in connection with International Application No. PCT/US2017/025624.
Canadian Office Action dated Sep. 13, 2017 in connection with Canadian Application No. 2, 941,421.
European Office Action dated Mar. 13, 2018 in connection with European Application No. 15722607.7.
Canadian Office Action dated May 23, 2018 in connection with Canadian Application No. 2,941,423.
Australian Office Action dated Jun. 26, 2018 in connection with Australian Application No. 2015337093.
International Search Report and Written Opinion dated Aug. 30, 2018 in connection with PCT/US2018/030154.
European Office Action dated Nov. 13, 2018 in connection with European Application No. 15722607.7.
Chinese Office Action dated Dec. 24, 2018 in connection with Chinese Application No. 201580015121.6.
Deng et al., "Linked Strategy for the Production of Fuels via Formose Reaction", Sci. Reports 3 (2013), p. 1244.
Lin et al., "Alkaline quinone flow battery", Science 349(6255) (2015), pp. 1529-1532, abstract.
Parker et al., "Rechargeable nickel-3D zinc batteries: An energy-dense, safer alternative to lithium-ion", Science 356 (2017), pp. 415-418.
Notice of Acceptance dated Feb. 21, 2019 in connection with Australian application No. 2017246207.
Canadian Office Action dated Feb. 8, 2019 in connection with Canadian App. No. 2,941,423.
Komatsu et al., "Preparation of Cu-Solid Polymer Electrolyte Composite Electrodes and Application to Gas-Phase Electrochemical Reduction of CO2", Electrochimica Acta 40(6) (1995), pp. 745-753.
Sata et al., "Preparation and Properties of Anion Exchange Membranes Having Pyridinium or Pyridinium Derivatives as Anion Exchange Groups", Journal of Polymer Science Part A: Polymer Chemistry 36(1) (1998), pp. 49-58.
Torres et al., "Carbonate Species as OH—Carriers for Decreasing the pH Gradient between Cathode and Anode in Biological Fuel Cells" Env. Science & Tech. 42(23) (2008), pp. 8773-8777.
Ganesh, "Conversion of Carbon Dioxide into Methanol—a potential liquid fuel: Fundamental challenges and opportunities (a review)" Renewable and Sustainable Energy Reviews 31 (2014), pp. 221-257.
PCT/US2018/030154 International Search Report and Written Opinion dated Aug. 30, 2018 ("20180830ISR").

(56) References Cited

OTHER PUBLICATIONS

PCT/US2015/014328 International Search Report and Written Opinion dated Jul. 6, 2015 ("20150706ISR") International Preliminary Report on Patentability dated May 4, 2017 ("20170504IPRPa").
PCT/US2015/026507 International Search Report and Written Opinion dated Jul. 20, 2015 ("20150720ISR") International Preliminary Report on Patentability dated May 4, 2017 ("20170504IPRPb").
PCT/US2016/045210 Partial International Search Report dated Nov. 24, 2016 ("20161124PISR") International Search Report and Written Opinion dated Jan. 20, 2017 ("20170120ISR").
PCT/US2017/025624 Partial International Search Report dated Jun. 22, 2017 ("20170622PISR") International Search Report and Written Opinion dated Aug. 16, 2017 ("20170816ISR").
PCT/US2017/025628 International Search Report and Written Opinion dated Jul. 12, 2017 ("20170712ISR").
U.S. Appl. No. 15/677,797 Notice of Allowanced dated Aug. 29, 2018 ("20180829USOA").
U.S. Appl. No. 14/704,934 Office Action dated Dec. 1, 2015 ("20151201USOA") Office Action dated Apr. 27, 2016 ("20160427USOA").
U.S. Appl. No. 14/704,935 Office Action dated Oct. 26, 2015 ("20151026USOA").
U.S. Appl. No. 15/090,477 Notice of Allowance dated Oct. 24, 2016 ("20161024USOA").
U.S. Appl. No. 15/158,227 Office Action dated Mar. 22, 2017 ("20170322USOA") Office Action dated Sep. 22, 2017 ("20170922USOA") Notice of Allowance dated Jan. 31, 2018 ("20180131USOA").
U.S. Appl. No. 15/260,213 Office Action dated Sep. 1, 2017 ("20170901USOA") Office Action dated Jan. 29, 2018 ("20180129USOA").
U.S. Appl. No. 15/400,775 Office Action dated May 26, 2017 ("20170526USOA") Notice of Allowance dated Aug. 22, 2017 ("20170822USOA").
U.S. Appl. No. 15/810,106 Office Action dated Jun. 21, 2018 ("20180621USOA") Office Action dated Dec. 5, 2018 ("20181205USOA").
U.S. Appl. No. 15/908,325 Office Action dated Jan. 10, 2019 ("20190110USOA").

KR App. No. 10-2016-7022952 Korean Office Action dated Sep. 13, 2016 ("20160913KROA") Korean Office Action dated May 29, 2017 ("20170529KROA").
AU App. No. 2015337093 Australian Office Action dated Jun. 29, 2017 ("20170629AUOA") Australian Office Action dated Jun. 26, 2018 ("20180626AUOA").
EP. App. No. 15722607.7 European Office Action dated Mar. 13, 2018 ("20180313EPOA") European Office Action dated Nov. 13, 2018 ("20181113EPOA").
CA App. No. 2,941,423 Canadian Office Action dated Sep. 13, 2017 ("20170913CAOA") Canadian Office Action dated May 23, 2018 ("20180523CAOA").
CN App. No. 201580015121.6 Chinese Office Action dated Dec. 24, 2018 ("20181224CNOA").
Dewulf et al., "The electrochemical reduction of $CO_2$ to $CH_4$ and $C_2H_4$ at Cu/nafion electrodes (solid polymer electrolyte structures)", Catalysis Letters 1 (1988), pp. 73-80.
Weber et al., "Thermal and Ion Transport Properties of Hydrophilic and Hydrophobic Polymerized Styrenic Imidazolium Ionic Liquids", J. of Polymer Sci.: Part B: Polymer Physics 49 (2011), pp. 1287-1296.
Chen et al., "Composite Blend Polymer Membranes with Increased Proton Selectivity and Lifetime for Vanadium Redox Flow Batteries", J. of Power Sources 231 (2013), pp. 301-306.
Shironita et al., "Methanol generation by $CO_2$ reduction at a Pt-Ru/C electrocatalyst using a membrane electrode assembly", J. of Power Sources 240 (2013), pp. 404-410.
Yan et al., "Imidazolium-functionalized poly(ether ketone) as membrane and electrode ionomer for low-temperature alkaline membrane direct methanol fuel cell", Journal of Power Sources 250 (2014) pp. 90-97.
Partial International Search Report dated Jun. 22, 2017 in connection with International Application PCT/US2017/025624.
Canadian Office Action dated Sep. 13, 2017 in connection with Canadian Application No. 2, 941,423.
European Office Action dated Mar. 27, 2019 in connection with European App. No. 11713569.9.
Seshadri et al., "A New Homogeneous Electrocatalyst for the Reduction of Carbon Dioxide to Methanol at Low Overpotential", J. Electroanalytical Chem. 372 (1994), pp. 145-150.

\* cited by examiner

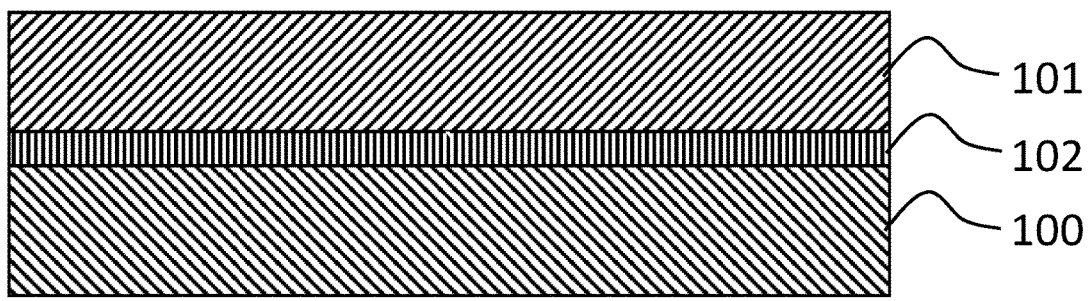

BATTERY SEPARATOR MEMBRANE AND BATTERY EMPLOYING SAME

CROSS-REFERENCE TO RELATED APPLICATIONS

The present application is a continuation-in-part of U.S. patent application Ser. No. 15/677,797 filed on Aug. 15, 2017, entitled "Battery Separator Membrane and Battery Employing Same". The '797 application claimed priority benefits, in turn, from U.S. provisional patent application Ser. No. 62/492,946 filed on May 1, 2017, entitled "Rechargeable Battery".

The present application is also a continuation-in-part of international application No. PCT/US2018/30154 filed on Apr. 30, 2018, which in turn claimed priority benefits from the '797 and '946 applications.

The present application is also related to U.S. patent application Ser. No. 15/090,477 filed on Apr. 4, 2016 (now U.S. Pat. No. 9,580,824 issued on Feb. 28, 2017), entitled "Ion-Conducting Membranes". The '477 application is, in turn, a continuation-in-part of U.S. patent application Ser. No. 14/704,935 filed on May 5, 2015 (now U.S. Pat. No. 9,370,773 issued on Jun. 21, 2016), entitled "Ion-Conducting Membranes". The '935 application was, in turn, a continuation-in-part of International Application No. PCT/US2015/14328, filed on Feb. 3, 2015 (published as International Publication No. WO 2016/064440 A1 on Apr. 28, 2016), entitled "Electrolyzer and Membranes". The '328 international application claimed priority benefits, in turn, from U.S. provisional patent application Ser. No. 62/066,823, filed on Oct. 21, 2014.

The '935 application was also a continuation-in-part of International Application No. PCT/US2015/26507, filed on Apr. 17, 2015 (published as International Publication No. WO 2016/064447 A1 on Apr. 28, 2016), entitled "Electrolyzer and Membranes". The '507 international application also claimed priority benefits, in turn, from U.S. provisional patent application Ser. No. 62/066,823 filed Oct. 21, 2014.

This application is also related to U.S. patent application Ser. No. 14/035,935, filed on Sep. 24, 2013 (now U.S. Pat. No. 9,370,773 issued on Jun. 21, 2016), entitled "Devices and Processes for Carbon Dioxide Conversion into Useful Fuels and Chemicals"; U.S. patent application Ser. No. 12/830,338, filed on Jul. 4, 2010 (published as U.S. Patent Application Publication No. US 2011/0237830 A1 on Sep. 29, 2011), entitled "Novel Catalyst Mixtures"; International application No. PCT/2011/030098 filed on Mar. 25, 2011 (published as International Publication No. WO 2011/120021 on Sep. 29, 2011), entitled "Novel Catalyst Mixtures"; U.S. patent application Ser. No. 13/174,365, filed on Jun. 30, 2011 (now U.S. Pat. No. 9,566,574 issued on Feb. 14, 2017), entitled "Novel Catalyst Mixtures"; International application No. PCT/US2011/042809, filed on Jul. 1, 2011 (published as International Publication No. WO 2012/006240 A1 on Jan. 12, 2012), entitled "Novel Catalyst Mixtures"; U.S. patent application Ser. No. 13/530,058, filed on Jun. 21, 2012 (published as U.S. Patent Application Publication No. US 2013/0015064 A1 on Jan. 17, 2013), entitled "Sensors for Carbon Dioxide and Other End Uses"; International application No. PCT/US2012/043651, filed on Jun. 22, 2012 (published as International Publication No. WO 2012/177952 A2 on Dec. 27, 2012), entitled "Low Cost Carbon Dioxide Sensors"; and U.S. patent application Ser. No. 13/445,887, filed on Apr. 12, 2012 (now U.S. Pat. No. 9,012,345 issued on Apr. 21, 2015), entitled "Electrocatalysts for Carbon Dioxide Conversion".

FIELD OF THE INVENTION

The present invention relates to separator membranes for electrochemical devices. In particular, the present invention relates to separator membranes for batteries and the resultant battery.

BACKGROUND OF THE INVENTION

Secondary lithium ion batteries now power most portable electronic devices, but lithium is highly flammable and lithium ion batteries need replacement more frequently than is ordinarily desirable. Many alternate battery chemistries and designs have been proposed, but they have inherent shortcomings.

Conventional alkaline batteries have been in use for many years. Alkaline batteries have reasonable energy densities, but they are difficult to recharge once fully discharged, due to zinc crossover during discharge and hydrogen formation during the recharging process.

In Lin et al., Science, 349, Issue 6255, pp. 1529-1532 (2015), a new battery is described with chemistry that avoids hydrogen formation. Lin's battery is limited, however, by the use of a separator membrane that has high resistance (approximately 0.895 ohm-cm$^2$ at room temperature).

In Parker et al., Science 356, Issue 6336, pp. 415-418 (2017), a new battery is described that can be discharged to 40% capacity and recharged. However, zinc crossover occurs at higher discharge, limiting performance.

SUMMARY OF THE INVENTION

Shortcomings of existing batteries are overcome by the use of a separator membrane comprising an ion-conducting polymeric composition comprising a copolymer of $R_a$-$R_s$ and $R_b$, wherein:
  (a) $R_a$ is selected from the group consisting of linear alkyls, branched alkyls, cyclic alkyls, heteroalkyls, aryls, heteroaryls, alkylaryls, and heteroalkylaryls;
  (b) $R_b$ is selected from the group consisting of linear alkyls, branched alkyls, cyclic alkyls, heteroalkyls, aryls, heteroaryls, alkylaryls, and heteroalkylaryls;
  (c) $R_s$ is a positively charged amine group or a positively charged phosphene group;
  (d) the copolymer comprises at least 3% of $R_a$ by weight;
  (e) the copolymer comprises at least 3% of $R_b$ by weight;
  (f) $R_a$ and $R_b$ are different chemical constituents; and
  (g) $R_a$-$R_s$ is not vinylpyridine.

In a preferred embodiment of the foregoing separator membrane:
  $R_a$ is a vinylbenzyl group;
  $R_b$ is substituted ethene having the structural formula:

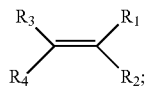

and
  $R_1$-$R_4$ are each independently selected from the group consisting of hydrogen, halogens, linear alkyls, branched alkyls, cyclic alkyls, heteroalkyls, aryls, heteroaryls, alkylaryls, and heteroalkylaryls.

In a preferred embodiment, the copolymer comprises between 5% and 90% of $R_a$ by weight, more preferably between 10% and 50% by weight.

In a preferred embodiment, the copolymer comprises between 5% and 90% of $R_b$ by weight, more preferably between 40% and 90% by weight.

In another embodiment, the ion-conducting polymeric composition comprises a terpolymer of styrene, vinylbenzyl-$R_s$ and vinylbenzyl-$R_x$, wherein:

(a) $R_s$ is a positively charged amine group;
(b) $R_x$ is a constituent selected from the group consisting of hydrogen, halogens, linear alkyls, branched alkyls, cyclic alkyls, heteroalkyls, aryls, heteroaryls, alkylaryls, and heteroalkylaryls;
(c) $R_x$ and $R_s$ are different chemical constituents;
(d) the total weight of the vinylbenzyl-$R_x$ groups is greater than 1% of the total weight of the terpolymer;
(e) the total weight of the vinylbenzyl-$R_s$ groups is 5% or more of the total weight of the terpolymer In an embodiment of the polymeric composition, $R_s$ is selected from the group consisting of ammoniums, imidazoliums, pyridiniums, pyrazoliums, pyrrolidiniums, pyrroliums, pyrimidiums, piperidiniums, indoliums, and triaziniums, preferably imidazoliums and pyridiniums.

In another embodiment of the polymeric composition, $R_s$ is an imidazolium. The imidazolium is preferably an alkylimidazolium, more preferably tetramethylimidazolium.

In another embodiment of the polymeric composition, $R_s$ is a pyridinium. The pyridinium is preferably an alkylpyridinium, more preferably pentamethylpyridinium.

In another embodiment of the polymeric composition, $R_s$ is an alkylammonium, preferably trimethylammonium.

In another embodiment of the polymeric composition, the polymer has a molecular weight between 1,000 and 10,000,000 atomic units (A.U.) preferably between 10,000 and 1,000,000 A.U., most preferably between 25,000 and 250,000 A.U.

The ion-conducting polymeric composition preferably comprises at least a portion of the separator membrane.

In another embodiment, the polymeric composition is in the form of a membrane. The membrane has a preferred thickness of from 10 to 300 micrometers.

In another embodiment, the polymeric composition is crosslinked.

In another embodiment, the polymeric composition further comprises at least one constituent selected from the group consisting of:

(a) a linear or substituted polyolefin;
(b) a polymer comprising uncharged cyclic amine groups;
(c) a polymer comprising at least one of a phenylene group and a phenyl group;
(d) a polyamide; and
(e) the reaction product of a constituent having two carbon-carbon double bonds.

In another embodiment, the polyolefin comprises at least one of polyethylene, polypropylene and/or polytetrafluoroethylene. The polymer comprising uncharged cyclic amine groups is preferably polybenzimidazole. The polymer comprising at least one of a phenylene group and a phenyl group is preferably polyphenylene oxide. The constituent having two carbon-carbon double bonds is preferably divinyl benzene or butadiene. The preferred polyamide constituent is polybenzimidazole.

In another embodiment, the polymeric membrane further comprises a porous layer, wherein the pores are between 0.5 and 3 nm in diameter.

In another embodiment, the foregoing battery also comprises at least one d-block element from the periodic table. The d-block element is preferably selected from the group of V, Cr, Mn, Fe, Co, Ni, Cu, Zn, Ag, Cd, and Hg. The d-block element can be bonded to organic ligands.

In another embodiment, the polymeric membrane further comprises a clay.

In another embodiment, the polymeric membrane further comprises a zeolite.

In another embodiment, the polymeric membrane further comprises a metal oxide.

In another embodiment, the polymeric membrane further comprises a nano-filtration or ultrafiltration membrane.

In another embodiment, the polymeric membrane further comprises alternate layers of:

(a) organic molecules or polymers comprised of anionic groups; and
(b) organic molecules or polymers comprised of cationic groups.

In another embodiment, the polymeric membrane further comprises molecules or polymers than can chelate metal ions.

In another embodiment, the polymeric membrane further comprises molecules or polymers having carboxylate ligands.

In another embodiment, the polymeric membrane further comprises a cation exchange ionomer. The cation exchange ionomer preferably comprises perfluorosulfonic acid.

In another embodiment, the polymeric membrane further comprises a reverse osmosis membrane.

In another embodiment the polymeric membrane comprises a polymerized positively charged cyclic amine surfactant.

Preferably, the positively charged cyclic amine surfactant is of the form:

$$R_{18}\text{-}R_{19}\text{-}R_{20}\text{-}R_{21}\text{-}R_{22}$$

where:
$R_{19}$ and $R_{21}$ are bifunctional groups comprising positively charged cyclic amines;
$R_{20}$ is a bifunctional group selected from linear alkyls, branched alkyls, cyclic alkyls, heteroalkyls, aryls, heteroaryls, alkylaryls, and heteroalkylaryls; and
$R_{18}$ and $R_{22}$ are each independently selected from linear alkyls, branched alkyls, cyclic alkyls, heteroalkyls, aryls, heteroaryls, alkylaryls, and heteroalkylaryls wherein each of the monofunctional groups $R_{18}$ and $R_{22}$ contain at least one unreacted double bond.

$R_{19}$ and $R_{21}$ are preferably positively charged cyclic amines.

$R_{18}$, $R_{20}$, and $R_{22}$ preferably contain no more than 20 carbon atoms.

In another embodiment, the battery separator comprises a positively charged cyclic amine surfactant. Preferably, the positively charged cyclic amine surfactant is of the form:

$$R_{18}\text{-}R_{19}\text{-}R_{20}\text{-}R_{21}\text{-}R_{22},$$

where:
$R_{19}$ and $R_{21}$ are positively charged cyclic amines;
$R_{20}$ is selected from linear alkyls, branched alkyls, cyclic alkyls, heteroalkyls, aryls, heteroaryls, alkylaryls, and heteroalkylaryls, but not polymers; and
$R_{18}$ and $R_{22}$ are independently selected from linear alkyls, branched alkyls, cyclic alkyls, heteroalkyls, aryls, heteroaryls, alkylaryls, and heteroalkylaryls containing an unreacted double bond.

The positively charged cyclic amines are preferably not imidazoliums. $R_{18}$, $R_{20}$, and $R_{22}$ preferably contain no more than 20 carbon atoms.

BRIEF DESCRIPTION OF THE DRAWING

FIG. 1 is a schematic diagram that broadly depicts a battery design.

DETAILED DESCRIPTION OF ILLUSTRATIVE EMBODIMENT(S)

It is understood that the process is not limited to the particular methodology, protocols and reagents described herein, as these can vary as persons familiar with the technology involved here will recognize. It is also to be understood that the terminology used herein is used for the purpose of describing particular embodiments only, and is not intended to limit the scope of the process. It also is to be noted that as used herein and in the appended claims, the singular forms "a," "an," and "the" include the plural reference unless the context clearly dictates otherwise. Thus, for example, a reference to "a linker" is a reference to one or more linkers and equivalents thereof known to those skilled in the art. Similarly, the phrase "and/or" is used to indicate one or both stated cases can occur, for example, A and/or B includes (A and B) and (A or B).

Unless defined otherwise, technical and scientific terms used herein have the same meanings as commonly understood by one of ordinary skill in the art to which the process pertains. The embodiments of the process and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as the skilled artisan would recognize, even if not explicitly stated herein.

Any numerical value ranges recited herein include all values from the lower value to the upper value in increments of one unit, provided that there is a separation of at least two units between any lower value and any higher value. As an example, if it is stated that the concentration of a component or value of a process variable such as, for example, size, angle size, pressure, time and the like, is, for example, from 1 to 98, specifically from 20 to 80, more specifically from 30 to 70, it is intended that values such as 15 to 85, 22 to 68, 43 to 51, 30 to 32, and the like, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the process are defined specifically. Particular methods, devices, and materials are described, although any methods and materials similar or equivalent to those described herein can be used in the practice or testing of the process.

Definitions

The term "polymer electrolyte membrane" refers to both cation exchange membranes, which generally comprise polymers having multiple covalently attached negatively charged groups, and anion exchange membranes, which generally comprise polymers having multiple covalently attached positively charged groups. Typical cation exchange membranes include proton conducting membranes, such as the perfluorosulfonic acid polymer available under the trade designation "NAFION" from E. I. du Pont de Nemours and Company (DuPont) of Wilmington, Del.

The term "anion exchange battery" as used here refers to a battery with an anion exchange membrane separating the anode from the cathode.

The term "faradaic efficiency" as used here refers to the fraction of the electrons applied to the cell that participate desired reactions.

The term "Hydrogen Evolution Reaction" also called "HER" as used here refers to the electrochemical reaction $2H^+ + 2e^- \rightarrow H_2$.

The term "Millipore water" is water that is produced by a Millipore filtration system with a resistivity of at least 18.2 megaohm-cm.

The term "imidazolium" as used here refers to a positively charged ligand containing an imidazole group. This includes a bare imidazole or a substituted imidazole. Ligands of the form:

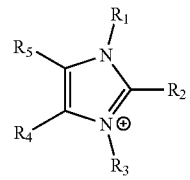

where $R_1$-$R_5$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "pyridinium" as used here refers to a positively charged ligand containing a pyridine group. This includes a bare pyridine or a substituted pyridine. Ligands of the form:

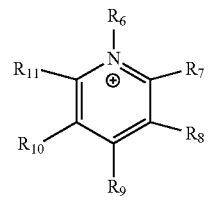

where $R_6$-$R_{11}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "phosphonium" as used here refers to a positively charged ligand containing phosphorus. This includes substituted phosphorus. Ligands of the form:

$P^+(R_{12}R_{13}R_{14}R_{15})$, where $R_{12}$-$R_{15}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "positively charged cyclic amine" as used here refers to a positively charged ligand containing a cyclic amine. This specifically includes imidazoliums, pyridiniums, pyrazoliums, pyrrolidiniums, pyrroliums, pyrimidiums, piperidiniums, indoliums, triaziniums, and polymers thereof, such as the vinyl benzyl copolymers described herein.

The term "surfactant" as use here is a molecule with a hydrophilic head group and a hydrophobic tail The term "positively charged cyclic amine surfactant" as used here refers to a surfactant whose head group contains a positively charged cyclic amine.

The term "polymerizable positively charged cyclic amine surfactant" as used here refers to a positively charged cyclic amine surfactant whose tail group or groups contain double bonds or other groups that can be polymerized.

The term "simple amine" refers to a species of the form:

$N(R_{16}R_{17}R_{18})$, where $R_{16}$, $R_{17}$ and $R_{18}$ are each independently selected from hydrogen, linear alkyls, branched alkyls, cyclic alkyls, heteroalkyls, aryls, heteroaryls, alkylaryls, and heteroalkylaryls, but not polymers.

The term "PIM" as used here refers to a polymer with intrinsic microporosity.

The term "clay" or "clay mineral" as used here refers to materials comprised of hydrous aluminum phyllosilicates.

The term "MOF" as used here refers to a metal-organic framework.

The term "d-block element" as used here refers to one or more of the following: Ti, V, Cr, Mn, Fe, Co, Ni, Cu, Zn, Zr, Nb, Mo, Tc, Ru, Rh, Pd, Ag, Cd, Hf, Ta, W, Re, Os, Ir, Pt, Au, Hg.

The term "nano-filtration membrane" as used here refers to a membrane with 1 nm to 50 nm diameter pores that pass through the membrane.

The term "reverse osmosis membrane" as used here refers to a membrane designed for reverse osmosis. It is a semipermeable membrane that uses pore sizes smaller than 1 nm to remove ions, molecules and larger molecules from water and other solvents.

The term "PSTMIM Solution" as referred here refers to a solution prepared as described in Specific Example 1.

The term "copolymer" as used here refers to a polymer derived from more than one species of monomer.

Specific Description

FIG. 1 illustrates a simple alkaline battery. The battery consists of an anode 100, a cathode 101 and a membrane electrolyte 102 interposed therebetween. The anode is typically zinc, copper or silver. The cathode is typically a metal oxide or hydroxide such as $MnO_2$ or $NiOOH$. During discharge the following reactions occur on the anode $$Zn(s) \rightarrow Zn^{2+}(aq) + 2e^- \quad (1)$$

$$Zn^{2+}(aq) + 4OH^-(aq) \rightarrow Zn(OH)_4^{2-}(aq) \quad (2)$$

while the following reaction occurs on the cathode:

$$2MnO_2(s) + H_2O(l) + 2e^- \rightarrow Mn_2O_3(s) + 2OH^-(aq) \quad (3)$$

There is also a reaction that can occur either on the anode or the cathode:

$$Zn(OH)_4^{2-}(aq) \rightarrow ZnO(s) + H_2O(l) + 2OH^-(aq) \quad (4)$$

Zinc dissolves into the KOH solution during reaction 1, and quickly reacts with hydroxides to form a dissolved complex. Some of the $Zn(OH)_4^{2-}$ complexes react on the anode, to produce a zinc oxide precipitate, but some of the $Zn(OH)_4^{2-}$ complexes diffuse through the membrane 102 and are deposited on the cathode 101 during discharge.

Recharging the battery requires the reactions to be run in reverse to redeposit metallic zinc on the anode and re-oxidize the $Mn_2O_3$ on the cathode. The zinc that is still in the anode can be efficiently converted back to metallic zinc. Dendrite formation should be limited, and technology exists to do so. The zinc on the cathode, though, is difficult to regenerate. Running at net is required for reducing conditions to dissolve the zinc oxide on the cathode. Running at net is also required for oxidizing conditions to re-oxidize the $Mn_2O_3$ on the cathode. This presents a problem because the zinc cannot be reduced and $Mn_2O_3$ cannot be oxidized at the same time.

In principle, the amount of zinc that is deposited on the cathode can be limited by tailoring the separator membrane appropriately. For example, if the membrane were designed to prevent or impede the transport of $Zn(OH)_4^{2-}$, yet permit the hydroxides to pass through the membrane, the deposition of ZnO on the cathode could be avoided, so the battery could be regenerated.

Care is required because if the membrane resistance for hydroxyl transport is too high, the battery will not be efficient. But in principle a proper separator membrane would allow a regeneratable alkaline battery to be produced.

In this application, separator membrane compositions are disclosed that exhibit low resistance for hydroxyl transport, and yet limit the transport of copper and zinc ions through the membrane.

Specific Example 1: Production of an Improved Membrane for an Alkaline Battery

PSTMIM Polymer Solution Preparation

The first step is to produce a polymer solution that will be referred to as a PSTMIM Polymer solution.

Step 1: Monomer Purification.

Inhibitor-free vinyl benzyl chloride (VBC) was prepared by adding a volume V of VBC (Dow Chemical, Midland, Mich.), and a volume equal to V/4 of 0.5 wt % aqueous sodium hydroxide (Sigma Aldrich, St. Louis, Mo.) into a separatory funnel. This was followed by agitating the funnel to mix the water and VBC, keeping the mixture still until it formed organic and inorganic layers, and then subsequently decanting the VBC. The process was repeated until the water layer did not show visible color change, which was about five times. The procedure was repeated using deionized water instead of sodium hydroxide solution until the water layer pH was neutral. Washed VBC was placed into a freezer overnight before weighing, to convert residual water to mainly ice, and the ice was then separated from the VBC by decantation.

Step 2: Preparation of Inhibitor Styrene.

Inhibitor-free styrene was prepared by feeding styrene (Sigma Aldrich, St. Louis, Mo.) through a 60-mL syringe packed with Sigma-Aldrich 311340 Inhibitor remover.

Step 3: Synthesis of Copolymer.

Poly(vinylbenzyl chloride-co-styrene) was then synthesized by heating a solution of inhibitor-free styrene (689 g, 6.62 mol) and vinylbenzyl chloride (573 g, 3.75 mol) in chlorobenzene (999 g) at 60±2° C. in a heating mantle for 24 hours under nitrogen gas with AIBN (α, α'-Azoisobutyronitrile) (Sigma Aldrich, St. Louis, Mo.) (11.85 g, 0.94 wt % based on the total monomers weight) as initiator. The copolymer, poly(VBC-co-St), was precipitated in methanol, then washed thoroughly and dried at 60° C. overnight.

Step 4: PSTMIM Solution Preparation.

1,2,4,5-tetramethylimidazole (172.8 g, 1.3914 mol), (TCI, Montgomeryville, Pa.) above-synthesized poly(VBC-co-St) (550 g), anhydrous methoxy-iso-propanol (MIP) (1600 g, Sigma-Aldrich), divinylbenzene (DVB) (22 g, 0.169 mol) and AIBN (0.22 g) were mixed under the protection of nitrogen flow. The mixture was stirred and heated to 65° C. for about 48 hours until viscosity reached around 800 cp. The resulting solution is referred to here as a "PSTMIM solution".

PSTMIM Membrane Preparation

The PSTMIM membranes were prepared by casting the PSTMIM polymer solutions prepared above directly onto a polyethylene terephthalate (PET) liner (LOPAREX LLC, Eden, N.C.). The thickness of the solution on the liner was controlled by a BKY (Geretsried, Germany) Automatic Film Applicator with an adjustable doctor blade. The membranes were then dried in a vacuum oven with temperature increased to 70° C. and held for 1 hour. After one more hour in the vacuum oven with temperature slowly decreased, the membrane was taken out of the oven and put inside a 1 M KOH (City Chemicals, West Haven, Conn.) solution overnight, during which time the membrane fell from the liner. The KOH solution was changed twice. In that way, the "chloride form" anion exchange membranes were converted into the hydroxide form.

U.S. Patent Application Publication No. US 2017/0128930 A1 discloses that membranes prepared in this way comprise a terpolymer of styrene, vinylbenzyl-$R_s$ and vinylbenzyl-$R_x$, in which $R_s$ is a positively charged cyclic amine group, and $R_x$ is at least one constituent selected from the group consisting of Cl, OH and a reaction product between an OH or a Cl and an inorganic species or an organic species other than an amine.

Examples of inorganic species include metal ions in the starting materials. Example of the organic species include the alcohols used as solvents or otherwise added during the synthesis.

U.S. Patent Application Publication No. US 2017/0128930 A1 also discloses that superior properties are obtained when the total weight of the vinylbenzyl-$R_x$ groups is greater than 1% of the total weight of the terpolymer, and the total weight of the vinylbenzyl-$R_s$ groups is 15% or more of the total weight of the terpolymer.

Membrane Characterization

Membrane Conductivity Measurement

The through-plane conductivity of the membrane was tested by measuring the electrochemical impedance spectrum (EIS) of a 5 cm² Fuel Cell Technologies (Albuquerque, N. Mex.) cell with a platinum catalyst cathode, an $IrO_2$ catalyst anode and a membrane to be tested in between the cathode and the anode.

A cathode was prepared as follows: 100 mg of Pt nanoparticles (Premion, Alpha Aesar) were suspended in 2 ml of isopropanol, 1 ml of deionized water and 0.2 ml of 5% dispersion of ionomer available under the trade designation NAFION (DuPont.) The mixture was ultrasonicated in a water bath for 10 minutes. The resulting cathode ink was spray coated onto a 5 cm×5 cm section of Sigracet 39 BC carbon paper (SGL Group, Meitingen, Germany). The electrode was dried at 80° C. for 20 minutes in an oven and cut into 4 pieces of 2.5 cm×2.5 cm for testing. The catalyst loading was about 2 mg/cm².

An anode was prepared in a similar way but with $IrO_2$ nanoparticles (Premion, Alfa Aesar) instead of platinum nanoparticles. The catalyst ink was spray coated onto 6 cm×6 cm stainless steel fiber cloth (AISI 316L-WNR, Bekaert, Zwevegem, Belgium.) The electrode was dried at 80° C. for 20 minutes in an oven and cut into 4 pieces of 3 cm×3 cm for testing. The actual loading was about 2 mg/cm².

The membrane prepared above was sandwiched between the Pt cathode and $IrO_2$ anode as described above, and mounted into 5 cm² fuel cell hardware (Fuel Cell Technologies, Albuquerque, N. Mex.), 1 M KCl was pumped into the anode and cathode and the Electrochemical Impedance Spectrum of the cell was measured with a potentiostat coupled with a frequency analyzer (Solartron, 1287+ 1255B). The cell resistance was assumed to be the membrane resistance, neglecting the contributions of resistance from other components such as electrodes and cell hardware. The area specific resistance (R) was determined by the intersection of the EIS spectrum on the real axis.

Table 1 shows area specific resistances (ASR) that were measured as described above.

TABLE 1

Specific resistances (ASR) that were measured

| Source | Temperature | ASR ohm-cm² | Leakage current, µA/cm² |
|---|---|---|---|
| Lin et al.[1] | 25° C. | 0.895 | <2.5 |
| Lin et al.[1] | 43° C. | 0.560 | |
| Specific Example 1 | 27° C. | 0.284 | <0.7 |
| Specific Example 1 | 43° C. | 0.127 | |

[1] Lin et al., Science, 349, Issue 6255, pp. 1529-1532 (2015).

It should be noted that the area specific resistance of the new membranes is less than one-third of that of Lin et al. Consequently, the energy loss will be less. Leakage currents are also smaller, further improving the performance of the new membranes.

$Cu^{2+}$ and $Zn^{2+}$ Crossover Measurements

The rate of crossover of $Cu^{2+}$ ions through the membrane was also measured. The following method was employed to measure the limiting current:

The membrane was sandwiched between one piece of stainless steel fiber felt (cathode) and one piece of Cu mesh (anode), and mounted in a 5 cm² Fuel Cell Technologies (Albuquerque, N. Mex.) fuel cell hardware. A 1 M $CuSO_4$ solution was prepared by dissolving $CuSO_4$ (Sigma Aldrich, St. Louis, Mo.) in Millipore water. $CuSO_4$ solution was fed to the anode flow field and de-ionized (DI) water was fed to the cathode flow field. The $Cu^{2+}$ crossed through the membrane from anode to cathode was reduced to $Cu^0$ at the cathode while the Cu anode dissolved into the anolyte to maintain constant concentration of $Cu^{2+}$ during the measurements. The current was limited by the permeability of $Cu^{2+}$ through the membrane. A linear sweep voltammogram (LSV) was conducted by scanning the potential from 0.05 to −0.3 V at 2 mV/s. The limiting current density appeared at −0.2 to −0.3 V. The limiting current density was used as a measure of $Cu^{2+}$ crossover through the membrane.

The rate of crossover of $Zn^{2+}$ ions through the membrane was also measured. The following method was employed to measure the limiting current:

The membrane was sandwiched between one piece of silver membrane (cathode) and one piece of copper mesh (anode), and mounted in a 5 cm² Fuel Cell Technologies fuel cell hardware. A 1 M $ZnNO_3$ solution was prepared by dissolving $ZnNO_3$ (Sigma Aldrich, St. Louis, Mo.) in Millipore water. $ZnNO_3$ solution was fed to the anode flow field and DI water was fed to the cathode flow field. The $Zn^{2+}$ crossing through the membrane from anode to cathode was reduced to $Zn^0$ at the cathode. The current was limited by the permeability of $Zn^{2+}$ through the membrane. The linear sweep voltammogram (LSV) was conducted by scanning the potential from −1.0 to −1.5 V at 2 mV/s. The limiting current density appeared at −1.3 to −1.4 V.

Table 2 shows the results that were obtained. Notice that the limiting Cu²⁺ current was only 10 mA/cm². This compares to hydroxide currents reported in co-owned U.S. patent application Ser. No. 15/406,909 above of 1,000 mA/cm².

Membranes have also been prepared in which 1,2,4,5-tetramethylimidazole in Specific Example 1, Step 4, by at least one of pyridine, quinoline, acridine, pyrazine, phenanthridine, 3 methyl-pyridine, phenylimadazole, DABCO, trimethylamine, and tetramethylpiperidine. Testing indicates that these membranes are useful as battery separators. Using trimethyl phosphine instead of 1,2,4,5-tetramethylimidazole could also yield a useful battery separator.

A figure of merit (FOM) for a given membrane is defined as:

$$FOM = \frac{(\text{Membrane conductivity})(\text{polypropylene crossover current})(\text{polypropylene thickness})}{(\text{Membrane crossover current})(\text{Initial polypropylene conductivity})(\text{membrane thickness})}$$

Table 2 shows the figure of merit for several examples.

TABLE 2

Comparison of the properties of the membranes considered here

| Membrane preparation | Example | Thickness, μM | Conductivity in 1M KOH mS/cm | Limiting current mA/cm² Cu | Limiting current mA/cm² Zn | Figure of merit Cu | Figure of merit Zn |
|---|---|---|---|---|---|---|---|
| Amine treated ceramic coated porous polypropylene | Comp. 1 | 25 | 15.6 | 43 | 10 | 1 | 1 |
| Base membrane | 1 | 90 | 40 | 10 | 0.79 | 3.1 | 6.9 |
| Membrane + reinforce | 2 | 40 | 40 | 9.3 | 1.39 | 7.4 | 8.9 |
| Cross linking | 3 | 63 | 57.3 | 18 | 12.6 | 3.5 | 0.9 |
| Porous polymers | 4 | 57 | 40 | 0.1 | 0.45 | 480 | 19.2 |
| Clay Layer | 5 | 52 | 36 | 11 | 1.21 | 4.3 | 7.1 |
| 13-X molecular sieve | 6 | 97 | 49 | 4.8 | 1.5 | 7.3 | 4.2 |
| MCM-41 | 6 | 97 | 64 | 3.5 | 1.4 | 13 | 5.8 |
| MOF layer | 7 | 140 | 78 | 5.6 | 3.3 | 6.9 | 2.1 |
| Metal oxide Filler | 8 | 52 | 49.5 | 7 | 1.2 | 9.4 | 9.8 |
| PPO Nanofiltration | 9 | 68 | 9.2 | 1.5 | 1.46 | 6.2 | 1.1 |
| 3M Nanofiltration | 9 | 80 | 30.25 | 2.28 | 1.25 | | 0.4 |
| Layer by layer | 10 | 66 | 19.7 | 1.7 | 0.027 | 12.1 | 136.4 |
| Chelator (DMI) | 11 | 64 | 58 | 80 | | 7.8 | |
| Carboxyl ligands | 12 | 110 | 45 | 4 | 2.04 | 7 | 2.5 |
| Nafion dispersed | 13 | 52 | 65 | 11.5 | 2.59 | 7.5 | 6 |
| Reverse osmosis | 14 | 160 | 0.025 | 0.0048 | 0.0208 | 2.2 | 0.1 |
| Surface treatment | 15 | 70 | 75.42 | 10.24 | 7.41 | 2.3 | 2.3 |

Comparative Example 1: Amine Coated Targray Membrane

Measurements were also performed using an amine coated Targray (Kirkland, Canada) battery separator. Most battery separators have a high resistance in 1 M KOH. Conductivities as low as 0.1 mS/cm were measured with commercial battery separators. The ceramic coated porous polypropylene membrane was an exception. When a ceramic coated porous polypropylene separator was coated with an amine surfactant, reasonable conductivities were obtained for a few hours before the amine washed away.

In detail, a 25 μM thick ceramic coated porous polypropylene separator #SH624w22VVV (Targray, Montreal, Canada) membrane was soaked for two minutes in a solution containing 1 wt % BIO-SOFTR N-300 (Stephan Company, Northfield, Ill.). The other 99% of the solution was composed of 30% deionized water and 70% by weight isopropanol (Sigma Aldrich, St. Louis, Mo.). The membrane was subsequently dried in an oven at 60° C. for 1 hour before use.

Next, the copper and zinc crossovers, and the membrane conductivity, were measured using the procedures in Specific Example 1.

Specific Example 2: Effect of Membrane Reinforcement

The objective of this example was to demonstrate that adding one constituent selected from the group consisting of:
(a) a linear or substituted polyolefin;
(b) a polymer comprising cyclic amine groups;
(c) a polymer comprising at least one of a phenylene group and a phenyl group; and
(d) a polyamide to the membrane reduces the crossover of the membrane.

A membrane was prepared as follows:
Step 1.
A PSTMIM solution was prepared as described in Specific Example 1.
Step 2.
The PSTMIM solution was diluted to 20% solids with ethanol.
Step 3.
A BKY (Geretsried, Germany) Automatic Film Applicator L was used to cast a thin film of the polymer solution onto a polypropylene backing sheet (Home Depot, Atlanta, Ga.) using a doctor blade. The solution was allowed to dry in ambient environment for 30 minutes to yield an approximately 15 micrometer thick polymer film.

Step 4.

Next a 10 μm thick porous expanded polytetrafluoroethylene (ePTFE) film (Philips Scientific Inc., Rock Hill, S.C.) was submerged for 30 minutes in a bath of ethanol to activate its surface for better wettability. (The porous ePTFE film was laid carefully taut over the deposited polymer film. The ePTFE film was also stretched in both x and y directions to fully open its pore structure as it was laid over the polymer film.

Step 5.

A 15 μm layer of the PSTMIM polymer solution was deposited on top of the ePTFE. The polymer film was left to settle for 15 minutes in ambient conditions before the whole reinforced membrane was placed in an oven at 65° C. for 60 minutes to improve adhesion of the polymer with the ePTFE. After the heating step, the membrane was then separated from the polypropylene backing sheet with the help of a razor blade and tweezers, and then activated as described in Specific Example 1.

Next, the copper and zinc crossovers and the conductivity were measured using the procedures in Specific Example 1. Results are shown in Table 2. Notice that the figure of merit is higher than in Specific Example 1.

Many other support materials can be used. In general, the support material can be made of
(a) a linear or substituted polyolefin;
(b) a polymer comprising cyclic amine groups;
(c) a polymer comprising at least one of a phenylene group and a phenyl group; or
(d) a polyamide.

The support material can be simply added to the polymer solution as described in co-owned U.S. Pat. No. 9,370,773. The support material can include a woven or non-woven material bonded or laminated to one side of the base material or ideally the support material can be sandwiched between an anion exchange polymer from both sides. Suitable woven materials can include, for example, scrims made of woven fibers of expanded porous polytetrafluoroethylene (ePTFE); webs made of extruded or oriented polypropylene or polypropylene netting or porous battery separators such as those supplied by Targray and Celgard.

Specific Example 3: Effects of Crosslinking

The objective of this example was to demonstrate that adding crosslinks reduces the metal crossover of the membrane. In particular, membranes containing the reaction product of a constituent having two carbon-carbon double bonds are shown to have reduced crossover.

A membrane was prepared as follows:

Step 1.

Poly(vinylbenzyl chloride-co-styrene) was prepared as described in Specific Example 1.

Step 2.

1,2,4,5-tetramethylimidazole (3.30 g, 0.0266 mol), above-synthesized poly(VBC-co-St) (10 g), methoxy-isopropanol (32 g, Sigma-Aldrich), divinylbenzene (DVB) (1.0 g, 0.0147 mol) and AIBN (0.008 g) were mixed under the protection of nitrogen flow. The mixture was stirred and heated to 75° C. for about 48 hours to obtain a crosslinked polymer solution containing the reaction product of a constituent having two carbon-carbon double bonds.

The crosslinked polymer solution was cast and activated followed the same procedure as in Specific Example 1 to yield a film for testing.

Next, the copper and zinc crossovers and the conductivity were measured using the procedures in Specific Example 1. Results are shown in Table 2. Notice that the figure of merit is similar to that of Specific Example 1.

Many other molecules could be used to crosslink the polymer. Examples include (a) molecules with two or multiple carbon-carbon double bonds such as 1,3-butadiene, isoprene, 1,3,5-heptatriene, 1,3,5-trivinylbenzene, 1,3,5-triethyl-2,4,6-trivinylbenzene, 5-methyl-1,3-cyclohexadiene, methylenebisacrylamide; (b) amines and diamines compounds, such as methylamine, ethylamine, N,N,N',N'-tetraacetylethylenediamine, 3(or 4),4'-diamino-biphenyl, 2,2'-diamino-biphenyl, 4,4'-oxydianiline, dipyridine; (c) azido compounds such as 2,6-bis(4-azidobenzylidene)cyclohexanone, 3-(4-azidophenyl)propionitrile or adipic acid dihydrazone; (d) halogenated or multiple halogenated compounds such as α,α'-dichloro-p-xylene, dibromo methylbenzene, tribromomethyl benzene; (e) dual functional compounds containing above functional groups, such as vinyl pyridine, vinyl imidazole, 3-azido-1-pronamine, 11-azido-3,6,9-trioxaundecan-1-amine Specific Example 4: Porous Polymers The objective of this example was to demonstrate that adding a layer of a nanoporous polymer with pores between 0.5 and 3 nm in diameter reduces the metal crossover of the membrane.

PIM-1 was chosen to demonstrate this phenomenon. PIM-1 has a random structure with pores between 0.5 and 3 nm.

PIM-1 was synthesized using chemicals obtained from Sigma-Aldrich and used directly without further treatment except as described otherwise. The procedure was carried out as follows;

PIM-1 was obtained by polymerization of 0.68084 g (2 mmol) 3,3,3',3'-tetramethyl-1,1'-spirobiindane-5,5',6,6'-tetraol (TTSBI, purified by re-crystallization in methanol) and 0.4 g (1.999 mmol) tetrafluoroterephthalonitrile (TFTPN) in 4 g 1-methyl-2-pyrrolidinone (NMP) containing 0.648 g (4.69 mmol) potassium carbonate ($K_2CO_3$) under nitrogen flow at 135-150° C. for 2 hours. After dilution with N-methyl-2-pyrrolidone (NMP), the polymer was precipitated into Millipore water and washed thoroughly, then dried in a vacuum oven at 80° C. overnight.

Next, PIM-1 was coated onto a membrane prepared as in Specific Example 1. First a 0.2% PIM-1 solution in chloroform was prepared by dissolving 0.03 g PIM-1 prepared above in 15 ml chloroform. Then, the solution was poured on the surface of the flat PSTMIM membrane prepared according to the method in Specific Example 1. Next, the resultant wet membrane was hung vertically in air to remove excess PIM solution. And then dried in oven at 60° C. for 2 hours. The membrane was then activated as described in Specific Example 1.

Next, the copper and zinc crossovers were measured using the procedures in Specific Example 1. Results are shown in Table 2. Notice that the figure of merit is higher than in Specific Example 1.

Other polymers or polymer membranes with pore sizes between 1 and 3 nm can also be employed. Examples include the PIM's described in McKeown, International Scholarly Research Network Materials Science, Volume 2012, Article ID 513986, and the Hyper-Cross-Linked Polymers, Covalent Organic Frameworks, Conjugated Microporous Polymers, Covalent Triazine Frameworks, Porous Aromatic Frameworks, Extrinsic Porous Molecules, and Porous Organic Cages described in Das et al. Chem. Rev., 2017, 117 (3), pp 1515-1563.

Specific Example 5: Addition of a Clay Layer

The objective of this example was to demonstrate that adding a layer containing a clay reduces the metal crossover of the membrane.

A membrane was prepared as follows:

Step 1.

A PSTMIM polymer solution was prepared as described in Specific Example 1.

Step 2.

A thin film (~15 µm) of PSTMIM polymer was cast on a polypropylene backing sheet from a polymer solution prepared as in Specific Example 1. The solution was allowed to dry in ambient environment for 30 minutes.

Step 3.

A clay solution was prepared by mixing K10 Montmorillonite (Sigma. Aldrich, St. Louis, Mo.) via sonicating 10 ml of polymer solution (prepared as described in Specific Example 1) to make a 5% by weight clay suspension.

Step 4.

A 15 µm thick layer of the Montmorillonite film was deposited on top of the film produced in step 2. The film was dried 30 minutes under ambient conditions.

Step 5.

A 15 µm thick layer of PSTMIM was finally deposited on-top of the film from step 4 using the procedures in Specific Example 1 to create a sandwich structure.

The membrane was then dried and activated as described in Specific Example 1. Next, the copper and zinc crossovers were measured using the procedures in Specific Example 1. Results are shown in Table 2. Notice that the figure of merit is higher than in Specific Example 1.

Other clays can perform similarly. Examples include other Montmorillonites such as K30, KSF and aluminum pillared Montmorillonites and other clays such as bentonite and functionalized bentonite used in fuel cell studies. Slurries of calcined clay and hydrite clay as described in U.S. Pat. No. 4,017,324 could also perform favorably.

Specific Example 6: Zeolite Layer

The objective of this example was to demonstrate that adding a layer containing a zeolite (13× molecular sieve) with a pore size between 1 and 5 nm reduces the metal crossover of the membrane.

A membrane was prepared as follows:

Step 1.

A PSTMIM polymer solution was prepared as described in Specific Example 1.

Step 2.

A thin film of PSTMIM solution was cast on a polypropylene backing sheet from a polymer solution prepared as in Specific Example 1. The solution was allowed to dry in ambient environment for 30 minutes to yield a 15 µm thick membrane.

Step 3.

A zeolite solution was prepared by mixing molecular sieves, 13×, 2 µm powder particles (Sigma Aldrich, St. Louis, Mo.) via sonication in 10 ml of polymer solution (prepared as described in Specific Example 1) to make a 5% by weight zeolite solution. Mesoporous materials such as ordered porous silica FCM-16 and Mobil Composition of Matter such as MCM-41 and MCM-48 can be similarly employed.

Step 4.

A 20 µm thick layer of the 13× molecular sieve solution was deposited on top of the film produced in step 2. The film was dried 30 minutes under ambient conditions.

Step 5.

A 20 µm thick layer of PSTMIM solution was finally deposited on-top of the film from step 4 using the procedures in Specific Example 1 to create a sandwich structure.

The membrane was then dried and activated as described in Specific Example 1. Then, the copper and zinc crossovers were measured using the procedures in Specific Example 1. Results are shown in Table 2. Notice that the figure of merit is higher than in Specific Example 1.

Other zeolites and molecular sieve material can be used as near equal alternatives. These include organophilic molecular sieves, ammonium Y zeolites and sodium Y zeolites. Other aluminosilicate minerals can be similarly used.

Specific Example 7: Addition of MOF Layer

The objective of this example was to demonstrate that adding an MOF reduces the metal crossover of the membrane.

A membrane is prepared as follows:

Step 1.

A PSTMIM polymer solution was prepared as described in Specific Example 1.

Step 2.

A thin film of PSTMIM solution was cast on a polypropylene backing sheet from a polymer solution prepared as in Specific Example 1. The solution was allowed to dry in ambient environment for 30 minutes to yield a 15 µm thick membrane.

Step 3.

An MOF was prepared by dissolving equimolar ratios of $Zn(NO_3)_2 \cdot 6H_2O$ and terephthalic acid in dimethylformamide to make a solution of 8% solids. These materials were obtained from Sigma Aldrich, St. Louis, Mo. The system was sealed in a hydrothermal reactor and heated at 100° C. for 5 hours. After the reaction was allowed to reach room temperature, crystals were obtained by filtering off the DMF and drying at room temperature.

Step 4.

An MOF solution was prepared by mixing the synthesized MOF particles via sonication in 10 ml of polymer solution (prepared as described in Specific Example 1) to make a 5% by weight MOF suspension.

Step 5.

A 15 µm thick layer of the MOF solution was deposited on top of the film produced in step 2. The film was dried 30 minutes under ambient conditions.

Step 6.

A 15 µm thick layer of PSTMIM was finally deposited on-top of the film from step 6 using the procedures in Specific Example 1 to create a sandwich structure.

The membrane was then dried and activated as described in Specific Example 1. Then, the copper and zinc crossovers were measured using the procedures in Specific Example 1. Results are shown in Table 2. Notice that the figure of merit is higher than in Specific Example 1.

Copper MOFs from copper nitrate can be synthesized and used from their reaction with terephthalic acid. Similarly, other MOFs can be incorporated into the membrane by either synthesis or directly purchasing from commercial sources such as Sigma Aldrich. These include those produced by BASF as well and can use other metals such as magnesium as well as other ligands networks.

Specific Example 8: Metal Oxide Filler

The objective of this example was to demonstrate that adding a metal oxide filler reduces the metal crossover of the membrane.

A membrane was prepared as follows

Step 1.

A PSTMIM solution was prepared as in Specific Example 1.

Step 2.

Titanium dioxide nanoparticles (Sigma Aldrich, St. Louis, Mo.) were added to this polymer solution, which amounts to 15% by weight of the polymer therein. A combination of magnetic stirring and sonication was used to uniformly disperse the metal oxide particles in the solution.

Step 3.

A membrane was subsequently cast and activated according to the procedure in Specific Example 1.

The membrane was then dried and activated as described in Specific Example 1. Then, the copper and zinc crossovers were measured using the procedures in Specific Example 1. Results are shown in Table 2. Notice that the figure of merit is higher than in Specific Example 1.

Other metal-based fillers can be used. These can be based on iron (for example, magnetite), zirconium (for example, yttria stabilized zirconia and zirconium phosphates) as well as oxides and ceramics based on other metals.

Specific Example 9: Addition of Nanofiltration Membrane

The objective of this example was to demonstrate that the addition of a nanofiltration membrane can reduce metal ion crossover. There are two examples, one a home-made poly (phenylene oxide) (PPO) nanofiltration membrane (example 9-1) and the other using a commercial nanofiltration membrane available from 3M Company.

Specific Example 9.1: PPO Nanofiltration Membrane

Step 1.

A PSTMIM membrane was formed on a polypropylene sheet as in Specific Example 1.

Step 2.

PPO solution preparation: a weight of 0.216 g poly(2,6-dimethyl-1,4-phenylene oxide) (PPO) (Sigma Aldrich, St. Louis, Mo.) was dissolved into 80 ml chloroform (Sigma Aldrich, St. Louis, Mo.) containing 0.0432 g ethylene glycol (Sigma Aldrich, St. Louis, Mo.) to make a PPO/CHCl$_3$ solution with a concentration of 0.27%.

Step 3.

PPO coated membrane preparation: the PPO solution prepared above was poured onto the surface of the membrane prepared in step 1. The excessive solution was drained by vertically hanging the membrane in the air for 5 minutes followed by drying in oven at 60° C. for 2 hours.

Step 4.

The resultant PPO coated membrane was soaked in DI water overnight to release the membrane from the liner and swell the membrane before testing. During activation, ethylene glycol leached out and left pores in the PPO coating layer.

Next, the copper and zinc crossovers were measured using the procedures in Specific Example 1. Results are shown in Table 2. Notice that the figure of merit is greater than in Specific Example 1.

Specific Example 9.2: Commercial Nanofiltration Membrane

Step 1.

A piece of about 10×15 cm$^2$ of 3M PES Flat sheet: 10243/18 nanofiltration membrane (3M Deutschland GmbH, Wuppertal, Germany) was taped at the edges to a PET liner with the air side facing down to the liner.

Step 2.

5 g of a PSTMIM solution prepared as in Specific Example 1 was poured onto the film from step 1 and was spread with a BKY (Geretsried, Germany) Automatic Film Applicator.

Step 3.

The membrane from step 2 was dried in a vacuum oven at 70° C. for 2 hours, followed by soaking overnight in deionized water to release the membrane from the liner and swell the membrane.

The membrane was then dried and activated as described in Specific Example 1. Then, the copper and zinc crossovers were measured using the procedures in Specific Example 1. Results are shown in Table 2. Notice that the figure of merit is lower than in Specific Example 1.

Specific Example 10: Alternating Anionic and Cationic Layers

The objective of this example was to demonstrate that adding a self-assembled layer-by-layer structure consisting of anionic and cationic layers reduces the metal crossover of the membrane.

A membrane was prepared as follows:

Step 1.

A PSTMIM solution was prepared as in Specific Example 1 and was cast and activated as in Specific Example 1.

Step 2.

Polystyrene sulfonate acid (PSS) solution was prepared by mixing Millipore water and polystyrene sulfonate acid (Sigma Aldrich, St. Louis, Mo.) to create a solution containing 20 mM of polystyrene sulfonate in water.

Step 3.

A poly-dially dimethyl ammonium chloride (PDDA) solution was made by mixing Millipore water and PDDA (Sigma Aldrich, St. Louis, Mo.) to create a solution containing 20 mM of PDDA in water.

Step 4.

The membrane from step 1 was placed into the solution from step 2 for 5 minutes to create a thin layer of the polystyrene sulfonate on the membrane surface.

Step 5.

The membrane from step 4 was removed from the polysulfonate sulfonate solution, washed with Millipore water, and air dried.

Step 6.

The membrane from step 5 was placed in the solution from step 3 for 5 minutes to create a thin layer of the PDDA on the membrane surface.

Step 7.

The membrane from step 6 was removed from the PDAA, washed with Millipore water, and air dried.

Step 8.

The membrane from step 7 was treated as in steps 4, 5, 6, and 7 to form a second layer of PSS and PDDA on the original membrane. Step 8 was repeated two more times.

Next, the copper and zinc crossovers were measured using the procedures in Specific Example 1. Results are shown in Table 2. Notice that the figure of merit is higher than in Specific Example 1.

Other multilayers could also be used. Specific examples include alternating layers of anion exchange polymers and cation exchange polymers, alternating layers of anionic and cationic molecules, or mixtures thereof.

Specific Example 11: Addition of a Chelator

The objective of this example was to demonstrate that adding ligands that can chelate the metal ions reduce the metal crossover of the membrane.

A membrane was prepared as follows:
Step 1.
A membrane was prepared as in Specific Example 1.
Step 2.
Poly(vinylbenzyl chloride-co-styrene) was prepared as in steps 1, 2 and 3 of Specific Example 1.
Step 3.
Preparation of PS-DIIMI: (Diimidazole): PS-DIIMI was first synthesized. A weight of 1.68 g of 2,2'-bis(4,5-dimethylimidazole) (DIIMI) (Sigma Aldrich, St. Louis, Mo.), 3 g of the above-synthesized poly(VBC-co-St), and 20 g N,N-dimethylformamide (DMF) were heated at 60-65° C. under stirring with the protection of nitrogen flow. A time of 34 hours later, the mixture was found to be very viscous. It was diluted with 17 g DMF and the reaction was continued to a total of 37 hours.

Step 4.
After cooling to room temperature, a small portion of the reaction mixture was diluted to 2-3% with DMF. Then, the diluted reaction mixture was poured on the surface of the membrane formed in step 1. The reaction mixture was then spread with a doctor blade, followed by drying in a vacuum oven at 70° C. for 2 hours.

The membrane was activated as in Specific Example 1. Then, the copper crossover was measured using the procedures in Specific Example 1. Results are shown in Table 2. Notice that the figure of merit is higher than in Specific Example 1.

Other chelators with similar functions can perform similarly. Examples include 1,1'-carbonyldiimidazole, 1,1'-thiocarbonyldiimidazole, 4,4'-dimethoxy-2,2'-bipyridine, and 2,2'-bipyridine-4,4'-dicarboxaldehyde.

Specific Example 12: Addition of Carboxyl Ligands

The objective of this example was to demonstrate that adding carboxyl ligands can reduce metal ion crossover.

A membrane was prepared as follows:
Step 1.
A PSTMIM solution was prepared as in Specific Example 1.
Step 2.
Benzene-1,4-dicarboxylic acid (terephthalic acid) (Sigma Aldrich, St. Louis, Mo.) was added to this polymer solution, which amounts to 15% by weight of the polymer therein. A combination of magnetic stirring and sonication was used to uniformly disperse the terephthalic acid in the solution.

Step 3.
The membrane was cast and activated according to the procedure in Specific Example 1.

Next the copper and zinc crossovers were measured using the procedures in Specific Example 1. Results are shown in Table 2. Notice that the figure of merit is higher than in Specific Example 1.

Specific Example 13: Addition of a Cation Exchange Polymer

The objective of this example was to demonstrate that adding a cation exchange polymer to the membrane can reduce crossover. A membrane was prepared as follows:
Step 1.
A PSTMIM solution was prepared as in Specific Example 1.
Step 2.
Perfluorosulfonic acid solution 1100 EW (available under the trade designation "LIQUION", item LQ-1105, from Ion Power, New Castle, Del.) was mixed into 10 mL of PSTMIM solution from step 1 to make 4% by weight perfluorosulfonic acid. A combination of magnetic stirring and sonication was used to uniformly mix the two solutions.

Step 3.
The 35 μm membrane was cast and activated according to the procedure in Specific Example 1.

Next, the copper and zinc crossovers were measured using the procedures in Specific Example 1. Results are shown in Table 2. Note that the figure of merit is similar to that in Specific Example 1.

Specific Example 14: Reverse Osmosis Membrane

The objective of this example is to demonstrate that a reverse osmosis membrane can reduce metal crossover.

A membrane was prepared as follows:
Step 1.
A PSTMIM polymer solution was prepared as in Specific Example 1.
Step 2.
A thin film of the polymer from step 1 was deposited on one side of a Dow BW30XFR reverse osmosis (RO) membrane (Dow Chemical, Midland, Mich.) to yield a 10 μm thick film.
Step 3.
After letting the polymer film dry in ambient conditions for 30 minutes, another 10 μm polymer film was similarly cast on the other side of the RO membrane.
Step 4.
After drying for another 30 minutes in ambient conditions, the RO-polymer membrane was then activated in 1 M KOH solution as described in Specific Example 1.

Next, the copper and zinc crossovers and the conductivity were measured using the procedures in Specific Example 1. Results are shown in Table 2. Notice that the figure of merit is lower than in Specific Example 1.

Many other support reverse osmosis membranes can be used. In general, the RO membrane can be made of polyimides, polyamides, polypropylene, and/or polyesters.

Specific Example 15: Surface Modification

The object of this example was to demonstrate that adding a layer with a high concentration of positively charged species can reduce crossover.

A membrane was prepared as follows:

Step 1.

Synthesis of VBC polymer: a solution of inhibitor-free 3,4-vinylbenzyl chloride (100 g, 0.655 mol) in chlorobenzene (80 g) containing AIBN (0.94 g, 0.94 wt % of VBC) as initiator was heated at 60±2° C. under stirring in an oil bath for 24 hours with nitrogen flow. The VBC polymer was precipitated in methanol, then washed thoroughly and dried at 60° C. overnight.

Step 2.

Preparation of highly positive charged PSTMIM (47%) solution: 1,2,4,5-tetramethylimidazole (4.7 g, 0.378 mol), above-synthesized VBC polymer (10 g), anhydrous methoxy-iso-propanol (MIP) (30 g), divinylbenzene (DVB) (0.4 g, 0.003 mol in 1.6 g MIP) and AIBN (0.004 g in 0.67 g MIP) were mixed under the protection of nitrogen flow with stirring and heating at 75° C. for about 26 hours.

Step 3.

Two g of the solution from step 2 was diluted with 5.86 g ethanol (Sigma Aldrich, St. Louis, Mo.) and mixed for 10 min under strong agitation. Then, 0.03567 g of N,N,N',N'-tetramethylethylenediamine in 5 g ethanol was added into the above solution under strong agitation and mixed for 5 minutes.

Step 4.

Next, the solution from step 3 was cast on a PET liner using the procedure in Specific Example 1 and dried in air for about 20 minutes, with checking that the surface was dry and not sticky, to form a film that was about 5 μm thick.

Step 5.

Next, the resultant film was coated with PSTMIM solution prepared as in Specific Example 1. The obtained membrane was dried in a vacuum oven at 70° C. as before. Then, the membrane was soaked in DI water overnight before testing.

Next, the copper and zinc crossovers and the conductivity were measured using the procedures in Specific Example 1. Results are shown in Table 2. Notice that the figure of merit is similar to that in Specific Example 1.

Other surface treatments could yield a layer with a high concentration of positively changed species.

Specific Example 16: Addition of a Polymerized Positively Charged Cyclic Amine Surfactant Containing Pyridinium Step 1: Preparation of the Surfactant.

4.9 g of 11-Bromo-1-undecene (Sigma Aldrich) was dissolved in 78.6 g of 2-propanol (Sigma Aldrich) at room temperature. 11.3 g of 4,4'-Trimethylenedipyridine (Sigma Aldrich) was dissolved in 49 g of toluene at room temperature. The two solutions were mixed and then the reactor was heated to 80° C. and maintained for 19 hours.

Step 2: Purification.

The reactor was cooled to room temperature, and the solvent was removed by rotovaporation, the crude product was further purified by recrystallization in ethyl acetate (Sigma Aldrich) and then dried in a vacuum oven overnight to yield a surfactant gel.

Step 3: Casting.

5 g of the resultant surfactant, 5 g of glycerol and about 0.02 g of Dimethoxy-2-phenylacetophenone were dissolved in 15 g of DOWANOL PM. About 0.5 cc of the resultant solution was spread onto the surface of the membrane prepared in specific example 1. The membrane was placed under a UV blacklight for 2 hours to polymerize the surfactant.

Specific Example 17: Addition of a Polymerized Positively Charged Cyclic Amine Surfactant Containing Piperidinium Step 1: Preparation of the Surfactant.

11.2 g of 11-Bromo-1-undecene (Sigma Aldrich) was dissolved in 300 ml of methanol(Sigma Aldrich) at room temperature. 4.77 g of 4,4'-Trimethylenedbis)1-methylpiperidine) (Sigma Aldrich) was dissolved in 10 g of methanol at room temperature. The two solutions were mixed and then the reactor was heated to 60° C. and maintained for 24 hours.

Step 2: Purification.

The reactor was cooled to room temperature, and the solvent was removed by rotovaporation and washed in hexane and dried in vacuum overnight at 80° C.

Step 3: Casting.

5 g of the resultant surfactant, 5 g of glycerol and about 0.02 g of Dimethoxy-2-phenylacetophenone were dissolved in 15 g of DOWANOL PM. About 0.5 cc of the resultant solution was spread onto the surface of the membrane prepared in specific example 1. The membrane was placed under a UV blacklight for 2 hours to polymerize the surfactant.

Other positively charged cyclic amine surfactants could be substituted for the positively charged cyclic amine surfactant described in this specific example, including the polymerizable ionic liquid surfactants described in U.S. Pat. No. 7,931,824. In general, the polymerizable ionic liquids surfactants of the form:

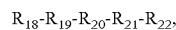

$R_{18}$-$R_{19}$-$R_{20}$-$R_{21}$-$R_{22}$, where:

$R_{19}$ and $R_{21}$ are bifunctional groups comprising positively charged cyclic amines;

$R_{20}$ is a bifunctional group selected from linear alkyls, branched alkyls, cyclic alkyls, heteroalkyls, aryls, heteroaryls, alkylaryls, and heteroalkylaryls, having no more than 20 carbon atoms; and $R_{18}$ and $R_{22}$ are monofunctional groups independently selected from linear alkyls, branched alkyls, cyclic alkyls, heteroalkyls, aryls, heteroaryls, alkylaryls, and heteroalkylaryls, wherein each of $R_{18}$ and $R_{22}$ contain at least one polymerizable double bond.

The '824 patent discloses surfactants where $R_{19}$ and $R_{21}$ comprise imidazoliums. The results here suggest that it may be preferred for $R_{19}$ and $R_{21}$ to be something other than an imidazolium to better control the pore size.

While the example here used the membrane in specific example 1 as a support, other ion conducting polymers could also be used. In addition, porous, microporous or nanofibrous materials could be used. Examples of porous materials useful for an alkaline battery include: ePTFE, porous polyethylene(PE), porous polypropylene (PE), porous high-density polyethylene (HDPE), porous crosslinked polyvinyl alcohol (PVA), porous polystyrene (PS), and porous polysulfone (PSO).

Specific Example 18: Alternate Copolymers

This example illustrates the production of a battery separator comprising an anion-conducting polymeric composition comprising the copolymer of $R_a$-$R_s$ and $R_b$, wherein:

(a) $R_a$ is selected from the group consisting of linear alkyls, branched alkyls, cyclic alkyls, heteroalkyls, aryls, heteroaryls, alkylaryls, and heteroalkylaryls;

(b) $R_b$ is selected from the group consisting of linear alkyls, branched alkyls, cyclic alkyls, heteroalkyls, aryls, heteroaryls, alkylaryls, and heteroalkylaryls;

(c) $R_s$ a positively charged amine group or a positively charged phosphene group;

(d) the polymeric composition comprises at least 3% of $R_a$ by weight of the copolymer;

(e) the polymeric composition comprises at least 3% of $R_b$ by weight of the copolymer;

(f) $R_a$ and $R_b$ are different chemical constituents; and (g) $R_a$-$R_s$ is not vinylpyridine.

In particular, this example shows that a terpolymer of styrene, vinylbenzyl-$R_s$ and acrylonitrile is a useful battery separator membrane.

The membrane was prepared as follows:

First, inhibitor free styrene was prepared by adding a volume V of styrene (Sigma-Aldrich, Saint Louis, Mo.) and a volume equal to V/4 of 4% aqueous sodium hydroxide into a separatory funnel followed by agitating the funnel to mix the water and styrene, then decanting the styrene layer. The process was repeated five times until the water layer did not show obvious color change. The procedure was repeated using pure water instead of sodium hydroxide solution until the water layer pH was neutral. Washed styrene was put into a freezer overnight before weighing to make sure any residual water was mainly in ice form and was then separated from styrene by filtration or decantation. 4-vinylbenzyl chloride (4-VBC) was treated in the same manner as styrene. Acrylonitrile (Sigma-Aldrich) monomer was used without any pretreatments.

Poly(acrylonitrile-co-vinylbenzyl chloride-co-styrene) was then synthesized by heating a solution of inhibitor free styrene (Sigma-Aldrich) (9 g, 0.086 mol) and 4-vinylbenzyl chloride (Dow Chemical) (7 g, 0.045 mol) along with acrylonitrile (Sigma-Aldrich) amounting to ~8% by weight of styrene (0.7128 g, 0.013 mol) in toluene (Sigma-Aldrich) (15 g, 0.16 mol) at 55-60° C. in an oil bath for 22 hours under nitrogen gas with AIBN (α,α'-Azoisobutyronitrile, Sigma-Aldrich) (0.16 g, 0.95 wt % based on the total monomers weight) as initiator. The copolymer was precipitated in ethanol and washed thoroughly and dried at 40° C. for 24 hours.

Next, 1,2,4,5-tetramethylimidazole (TCI, Japan) (1.05 g, 0.00845 mol), the above-synthesized Poly(acrylonitrile-co-vinylbenzyl chloride-co-styrene) (3.4118 g), 1-methoxy-2-propanol (11 g, Sigma-Aldrich, USA), DVB (0.17 g, 0.0013 mol) and AIBN (0.035 g) were mixed under the protection of nitrogen flow. The mixture was stirred and heated to 75° C. for about 1 hour. When the solution turned clear, reaction temperature was decreased to 55° C. and maintained for 70 hours to obtain the imidazolium functionalized terpolymer.

The membranes were prepared by casting the polymer solutions prepared above directly onto a polyethylene terephthalate (PET) liner. The thickness of the solution on liner was controlled by a film applicator (MTI Corporation, Richmond, Calif.) with an adjustable doctor blade. The membranes were then dried in a vacuum oven with temperature increased to 70° C. and held for 1 hour. After one more hour in the vacuum oven with temperature slowly decreased, the membrane was taken out of the oven and put inside a 1 M KOH solution overnight, during which time the membrane fell from liner. The KOH solution was changed twice, each with about 2 hours of immersion, to make sure the membrane chloride ions were completely exchanged, so that the membranes were fully converted into the hydroxide form.

This membrane was found to be a useful battery separator.

As a second example terpolymer of styrene, vinylbenzyl-$R_s$ and oleic acid is a useful separator membrane, where $R_s$ is a positively charged amine. The membrane was prepared as follows:

First, inhibitor-free styrene was prepared by adding a volume V of styrene (Sigma-Aldrich, Saint Louis, Mo.) and a volume equal to V/4 of 4% aqueous sodium hydroxide into a separatory funnel followed by agitating the funnel to mix the water and styrene, then decanting the styrene layer. The process was repeated five times until the water layer did not show obvious color change. The procedure was repeated using pure water instead of sodium hydroxide solution until the water layer pH was neutral. Washed styrene was put into a freezer overnight before weighing to make sure any residual water was mainly in ice form and was then separated from styrene by filtration or decantation. 4-vinylbenzyl chloride (4-VBC) was treated in the same manner as styrene. Oleic acid (Sigma-Aldrich, Saint Louis, Mo. technical grade, 90%) was used without any pretreatments.

Poly(vinylbenzyl chloride-co-styrene-co-oleic acid) was then synthesized by heating a solution of inhibitor free styrene (Sigma-Aldrich) (4 g, 0.038 mol) and 4-vinylbenzyl chloride (Dow Chemical) (3.3 g, 0.022 mol) along with oleic acid (Sigma-Aldrich) (0.04 g), amounting to ~0.55% by weight of the 4-VBC-styrene mix in 1-methoxy-2-propanol (Sigma-Aldrich) (7 g, 0.078 mol) at 55-60° C. in an oil bath for 24 hours under nitrogen gas with AIBN (α,α'-azoisobutyronitrile, Sigma-Aldrich) (0.073 g, 1 wt % based on the total monomers weight) as initiator.

Next, 1,2,4,5-tetramethylimidazole (TCI, Japan) (3.1 g, 0.025 mol), 1-methoxy-2-propanol (7 g, 0.078 mol), DVB (0.16 g, 0.0013 mol) and AIBN (0.002 g, ~1.25% by weight of DVB) were added and mixed with the above synthesized terpolymer solution to continue the reaction. The mixture was stirred and heated to 75° C. for about 2 hours under the protection of nitrogen. When the solution turned clear, reaction temperature was decreased to 55° C. and an additional amount of 1-methoxy-2-propanol (6 g, 0.067 mol) was added to reduce the viscosity. The temperature was maintained at 55° C. for a further 22 hours to obtain the imidazolium functionalized terpolymer.

The membranes were prepared by casting the polymer solutions prepared above directly onto a PET liner. The thickness of the solution on the liner was controlled by a film applicator (MTI Corporation, Richmond, Calif.) with an adjustable doctor blade. The membranes were then dried in a vacuum oven with temperature increased to 70° C. and held for 1 hour. After one more hour in the vacuum oven with temperature slowly decreased, the membrane was taken out of the oven and put inside a 1 M KOH solution overnight, during which time the membrane fell from the liner. The KOH solution was changed twice, each with about 2 hours of immersion, to make sure the membrane chloride ions were completely exchanged, so that the membranes were fully converted into the hydroxide form.

This membrane was found to be a useful battery separator.

The examples given above are merely illustrative and are not meant to be an exhaustive list of all possible embodiments, applications or modifications of the present electrochemical device. Thus, various modifications and variations of the described methods and systems of the invention will be apparent to those skilled in the art without departing from the scope and spirit of the invention. In particular, the methods to enhance the figure of merit described in Specific Examples 2 through 15 could be applied to other polymeric battery separators. Although the invention has been described in connection with specific embodiments, it should be understood that the invention as claimed should not be unduly limited to such specific embodiments. Indeed, various modifications of the described modes for carrying out the invention that are obvious to those skilled in the chemical arts or in the relevant fields are intended to be within the scope of the appended claims.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A battery comprising a separator membrane, the separator membrane comprising an ion-conducting polymeric composition comprising a copolymer of $R_a$-$R_s$ and $R_b$, wherein:
   (a) $R_a$ is a vinylbenzyl group;
   (b) $R_b$ is substituted ethene having the structural formula:

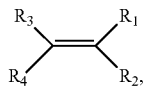

where $R_1$-$R_4$ are each independently selected from the group consisting of hydrogen, halogens, linear alkyls, branched alkyls, cyclic alkyls, heteroalkyls, aryls, heteroaryls, alkylaryls, and heteroalkylaryls;
   (c) $R_s$ is a positively charged amine group or a positively charged phosphene group;
   (d) the copolymer comprises at least 3% of $R_a$ by weight;
   (e) the copolymer comprises at least 3% of $R_b$ by weight;
   (f) $R_a$ and $R_b$ are different chemical constituents; and
   (g) $R_a$-$R_s$ is not vinylpyridine.

2. The battery of claim 1, wherein the copolymer comprises between 5% and 90% of $R_a$ by weight.

3. The battery of claim 2, wherein the copolymer comprises between 10% and 50% of $R_a$ by weight.

4. The battery of claim 1, wherein the copolymer comprises between 5% and 90% of $R_b$ by weight.

5. The battery of claim 4, wherein the copolymer comprises between 40% and 90% of $R_b$ by weight.

6. The battery of claim 1, wherein $R_s$ is selected from the group consisting of ammoniums, imidazoliums, pyridiniums, pyrazoliums, pyrrolidiniums, pyrroliums, pyrimidiums, piperidiniums, indoliums, and triaziniums.

7. The battery of claim 6, wherein $R_s$ is an imidazolium.

8. The battery of claim 7, wherein said imidazolium is tetramethylimidazolium.

9. The battery of claim 6, wherein $R_s$ is a pyridinium.

10. The battery of claim 9, wherein said pyridinium is an alkylpyridinium.

11. The battery of claim 6, wherein said $R_s$ is an alkylammonium.

12. The battery of claim 1, wherein said polymer has a molecular weight between 1,000 and 10,000,000 atomic units (A.U.).

13. The battery of claim 12, wherein said copolymer has a molecular weight between 10,000 and 1,000,000 A.U.

14. The battery of claim 13, wherein said copolymer has a molecular weight between 25,000 and 250,000 A.U.

15. The battery of claim 1, wherein said ion-conducting polymeric composition comprises at least a portion of said separator membrane.

16. The battery of claim 15, wherein said battery separator membrane has a thickness between 10 and 300 micrometers.

17. The battery of claim 1, wherein said separator membrane comprises a positively charged cyclic amine surfactant having the formula:

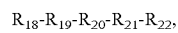

where:
   $R_{19}$ and $R_{21}$ are bifunctional groups comprising positively charged amines;
   $R_{20}$ is a bifunctional group selected from linear alkyls, branched alkyls, cyclic alkyls, heteroalkyls, aryls, heteroaryls, alkylaryls, and heteroalkylaryls, having at most 20 carbon atoms; and
   $R_{18}$ and $R_{22}$ are each a monofunctional group independently selected from the group consisting of linear alkyls, branched alkyls, cyclic alkyls, heteroalkyls, aryls, heteroaryls, alkylaryls, and heteroalkylaryls, wherein each of $R_{18}$ and $R_{22}$ contains an unreacted double bond.

18. The battery of claim 17, wherein $R_{19}$ and $R_{21}$ are positively charged cyclic amines.

19. The battery of claim 18, wherein the separator membrane comprises a porous support.

* * * * *